United States Patent [19] [11] 4,210,887

Matsko et al. [45] Jul. 1, 1980

[54] CIRCUIT INTERRUPTER WITH INTERLOCKED INTERCHANGEABLE TRIP UNIT

[75] Inventors: Joseph J. Matsko, Beaver; Robert H. Hill, South Beaver; Paul Skalka, Beaver; Alfred E. Maier, Beaver Falls, all of Pa.

[73] Assignee: Westinghouse Electric Corp., Pittsburgh, Pa.

[21] Appl. No.: 853,990

[22] Filed: Nov. 23, 1977

[51] Int. Cl.[2] .......................... H01H 9/24; H02H 3/08

[52] U.S. Cl. .......................................... 335/6; 335/160; 335/172; 361/96

[58] Field of Search ........................... 335/6, 160, 172; 361/96, 100

[56] References Cited

U.S. PATENT DOCUMENTS

| | | | |
|---|---|---|---|
| 3,761,777 | 9/1973 | Willard et al. | 361/96 |
| 3,826,951 | 7/1974 | Mater et al. | 335/160 |
| 4,037,183 | 7/1977 | Gaskill | 335/172 |

*Primary Examiner*—Harold Broome
*Attorney, Agent, or Firm*—Robert E. Converse, Jr.

[57] ABSTRACT

A circuit interrupter includes an interchangeable trip unit removably disposed in the circuit interrupter housing and connected between a current transformer and a trip mechanism. The trip unit contains electronic circuitry for activating the trip mechanism to open the contacts upon detection of overload current therethrough and includes rejection means provided to ensure that only a trip unit having circuitry compatible with the electrical characteristics of the circuit interrupter can be inserted into the housing. The rejection means comprise a plurality of pins mounted within the housing and extending into the recess to be occupied by the trip unit. The pins are arranged in a pattern unique to all circuit interrupters having identical electrical characteristics. A pattern of holes is provided in the enclosure of the trip unit, the hole pattern being unique to trip units having identical electrical characteristics. The pin pattern and hole pattern of compatible circuit interrupters and trip units, respectively, are identical, permitting such compatible trip units to receive all rejection pins of compatible circuit interrupters such that said compatible trip units can be completely inserted into the recess of the circuit interrupter housing. Interlock means are provided such that the circuit breaker mechanism is disposed in a trip free condition preventing closure of the contacts unless a trip unit is completely inserted into the circuit interrupter housing recess.

7 Claims, 10 Drawing Figures

CIRCUIT INTERRUPTER WITH INTERLOCKED INTERCHANGEABLE TRIP UNIT

CROSS REFERENCE TO RELATED APPLICATIONS

The present invention is related to material described in copending U.S. patent application Ser. No. 853,983 entitled "Circuit Breaker With Replaceable Trip Unit" filed Nov. 23, 1977 by J. J. Matsko et al; U.S. patent application Ser. No. 853,991 entitled "Circuit Interrupter With Improved Adjustable Trip Unit" filed Nov. 23, 1977 by J. J. Matsko et al; U.S. patent application Ser. No. 728,088, filed Sept. 30, 1976 by A. B. Shimp et al; and U.S. patent application Ser. No. 811,227 entitled "Trip Mechanism Reset" filed June 29, 1977 by S. A. Mrenna et al.

BACKGROUND OF THE INVENTION

1. Field of the Invention

The invention relates generally to electrical apparatus, and more particularly, to circuit interrupters having interchangeable trip units.

2. Description of the Prior Art

Circuit breakers are widely used to protect electrical circuits and apparatus from damage due to overcurrent conditions. Early circuit breakers usually provided trip units having thermal and magnetic mechanisms to trip the breaker upon overcurrent conditions. Some of these breakers provided interchangeable trip units to allow the trip current rating to be changed without substituting an entire circuit breaker.

As electrical distribution circuits became more complex, it was necessary to provide coordination and interaction between circuit breakers so that breakers on various portions of the system would trip at different levels and with different time delays following occurrence of a fault. This flexibility was provided by shunt trip mechanisms using electronic circuits to analyze a signal produced by a current transformer or other sensing means to generate a trip command to the shunt trip mechanism upon occurrence of a predetermined overload current. An example of such a circuit breaker employing a trip unit with an electronic circuit is described in U.S. Pat. No. 3,826,951 issued July 30, 1974 to A. E. Maier and A. B. Shimp and assigned to the assignee of the present invention.

Circuit breaker parameters which can be varied to suit the application include the level of fault current which can be withstood without physical damage to the circuit breaker frame, the provision for ground fault detection, and the maximum continuous current which the circuit interrupter can withstand without suffering damage. In order to reduce the total cost of manufacturing and supplying a circuit interrupter, it is desirable to minimize both the tooling required in manufacturing the device and the number of types of devices needed to serve in a wide variety of applications. Circuit interrupters having electronic trip units lend themselves to economies in this manner by the ability to provide a variety of interchangeable circuit configurations having common mechanical specifications. However, this raises the possibility of installing a trip unit having circuitry which is not compatible with the electrical configurations of the circuit interrupter. It is desirable to provide a circuit interrupter having removable interchangeable trip units and the capability to prevent an improper trip unit from being installed in the breaker. It is further desirable to ensure that the contacts of the circuit interrupter will remain in an open position unless a proper trip unit is completely installed in the circuit breaker.

SUMMARY OF THE INVENTION

In accordance with the principles of the present invention, there is provided a circuit breaker mechanism disposed in a housing and including separable contacts, an operating mechanism, and a shunt trip device. The operating mechanism is responsive to manual operation to open and close the contacts, while the shunt trip device is responsive to electrical operation to open the contacts. The interrupter also includes sensing means responsive to current flow through the contacts, the sensing means being connected to an interchangeable trip unit removably disposed in the housing. The trip unit is also connected to the shunt trip device to activate it to open the contacts upon detection of overload current by the sensing means. The circuit interrupter further comprises rejection means including a first mechanical mating member disposed in the housing and a second mechanical mating member positioned upon the trip unit to cooperate with the first mating member. The cooperating mating members permit only a trip unit which is compatible with the operating mechanism in the sensing means to be completely inserted in the housing. Preferably, interlock means are also provided to maintain the circuit breaker mechanism in a trip free condition (wherein it is physically impossible to close the contacts) unless the trip unit is completely inserted in the housing.

DESCRIPTION OF THE PREFERRED EMBODIMENT

Figure 1:
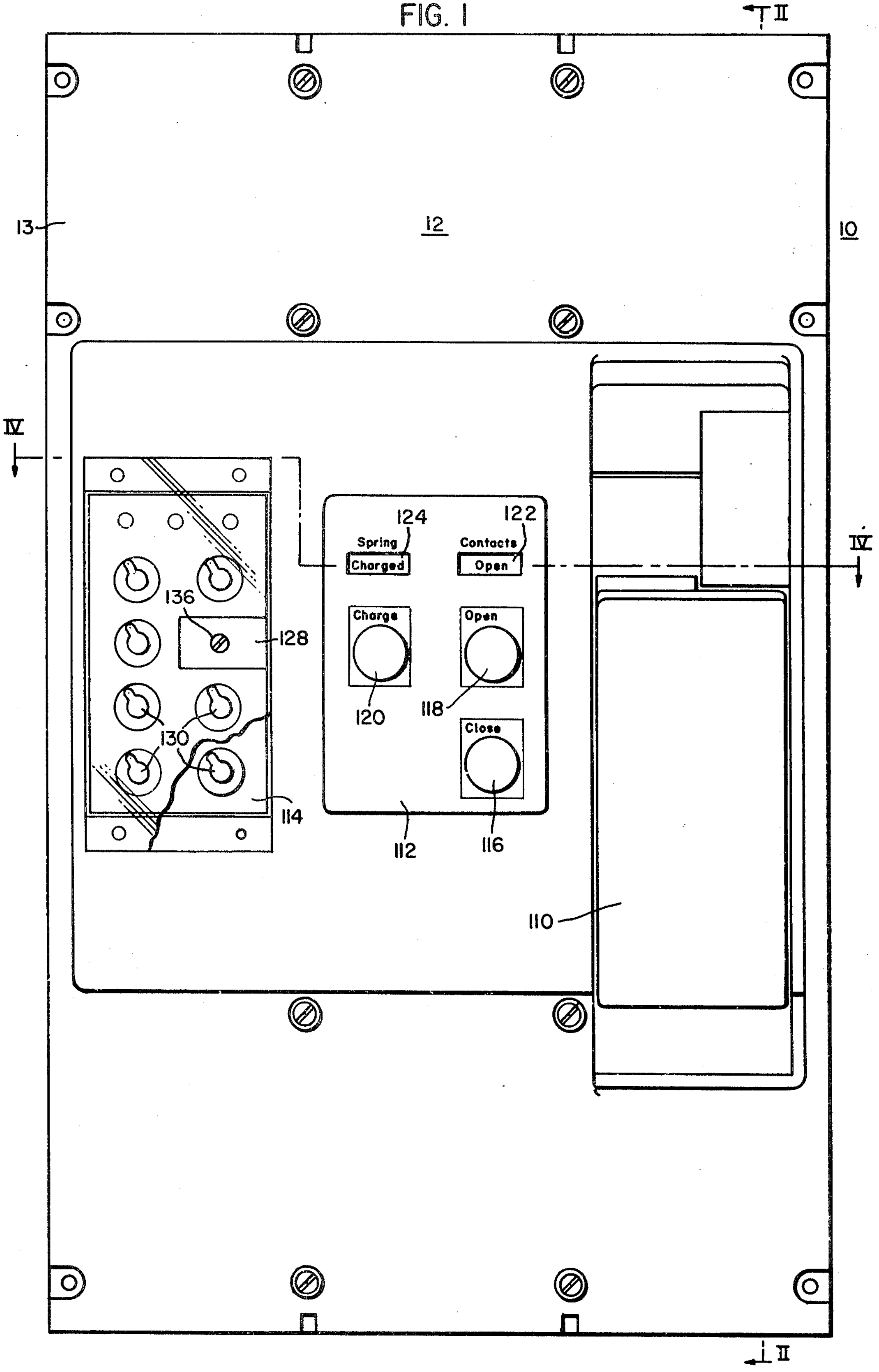
FIG. 1 is a front-elevational view of a circuit interrupter employing the principles of the present invention.
Figure 2:
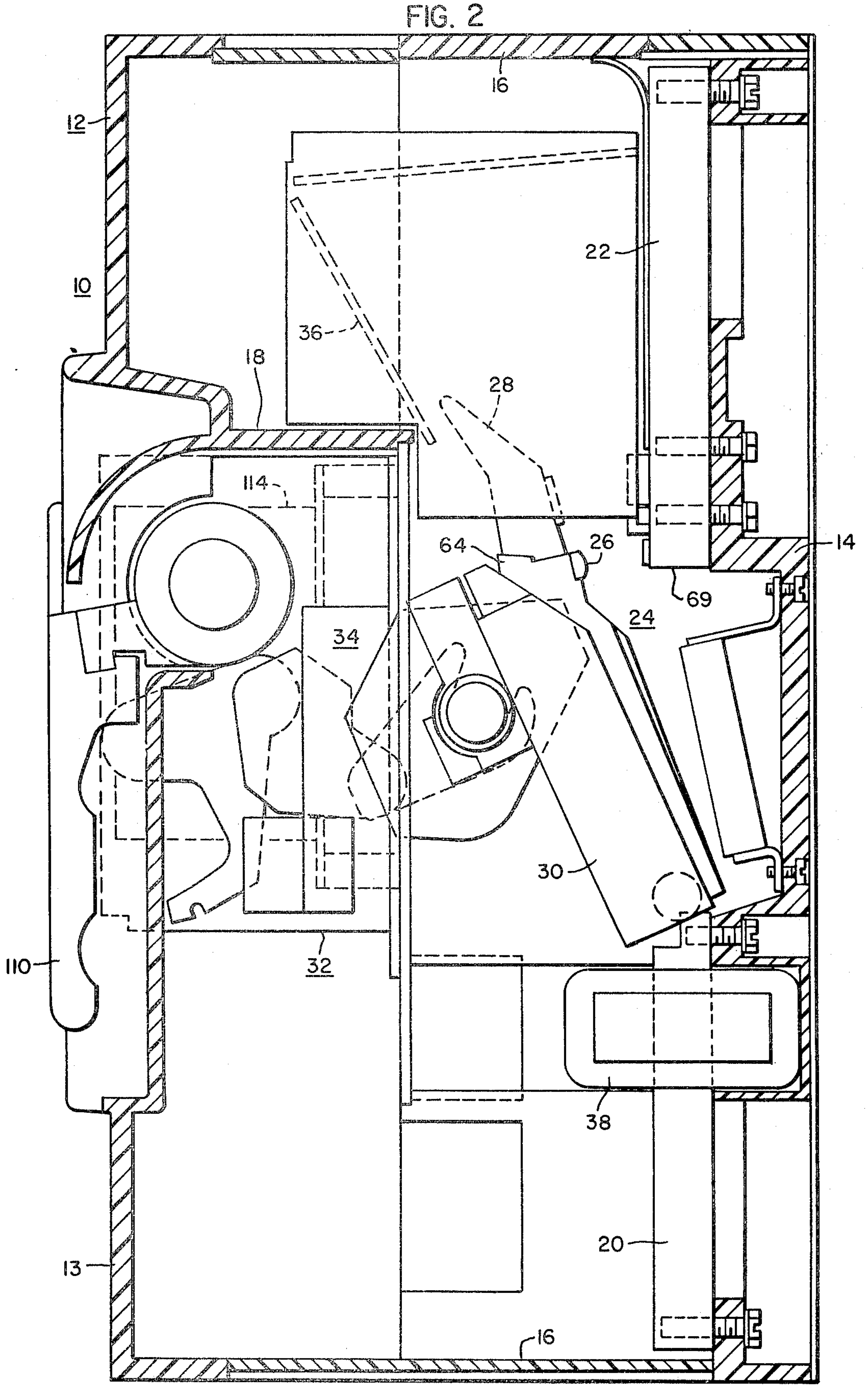
FIG. 2 is a side-sectional view of the circuit breaker of FIG. 1, taken along the line II—II of FIG. 1.

Referring now to the drawings, in which like reference characters refer to corresponding members, there is shown in FIGS. 1 and 2 a stored energy molded case circuit breaker 10 constructed in accordance with the principles of the present invention. Although the description of the invention is made with reference to this particular circuit breaker, it is to be understood that the invention is applicable to circuit breakers generally.

The circuit breaker 10 includes a housing 12 comprising a cover 13, a mounting base 14, side walls 15, and a frame structure 18. A pair of stationary contacts 20, 22 are disposed within the housing 12. Stationary contact 22 would, for example, be connected to an incoming power line (not shown), while the other stationary contact 20 would be connected to the load (not shown). Electrically connecting the two stationary contacts 20, 22 is a movable contact structure 24. Movable contact structure 24 comprises a movable contact 26, a movable arcing contact 28, a contact carrier 30, and a contact holder 64. The movable contact 26 and the arcing contact 28 are pivotally secured to the stationary contact 20, and are operable between open and closed positions with respect to the stationary contact 22. Throughout this specification, the term "open" is used with respect to the contact positions means that the movable contacts 26, 28 are spaced apart from the stationary contact 22, whereas the term "closed" indicates the position wherein the movable contacts 26, 28 are contacting both stationary contacts 22 and 20. The movable contacts 26, 28 are mounted to and carried by the contact carrier 30 and contact holder 64.

Also included within the circuit breaker 10 is an operating mechanism 32, a toggle means 34, and an arc chute 36 which extinguishes any arc which may be present when the movable contacts 26, 28 are operated from the closed to the open position. A current transformer 38 is utilized to monitor the amount of current flowing through the stationary contact 20.

FIG. 1 shows the front of the cover 13 and the relative positions of an operating handle 110, a control panel 112, and a trip unit 114. The handle 110 is used for manual operation to charge powerful operating springs (not shown) providing stored energy to move the contacts 26, 28 between open and closed positions. This movement is controlled from the control panel 112 which includes push buttons 116, 118, 120 and indicating flags 122 and 124. The button 120 is used to activate a motor (not shown) which can perform the same operation as the handle 110 to charge the operating springs. When the springs are so charged, this status is indicated by the flag 124. Manual operation of the push button 116 or 118 will serve to discharge the operating springs and move the contacts 26, 28 between the open and closed positions. Such operation thus provides a switching function during periods of normal conditions.

During overload current conditions on the circuit, the contacts 26, 28 will move automatically from the closed to the open position. The characteristics of this tripping operation are controlled by the trip unit 114 which contains electronic circuitry to process the sensing signals produced by the transformer 38. This circuitry is described more completely in the aforementioned U.S. patent application Ser. No. 728,088. The nominal level of current which will initiate the tripping operation, i.e., the trip current rating, is determined by a removable plug-in rating adjuster 128 which contains resistance means cooperating with the electronic circuitry within the trip unit 114 to establish the trip current rating. Other characteristics of the trip unit are adjustable through the use of controls 130, more completely described in the aforementioned copending U.S. patent application Ser. No. 853,991.

Figure 6:
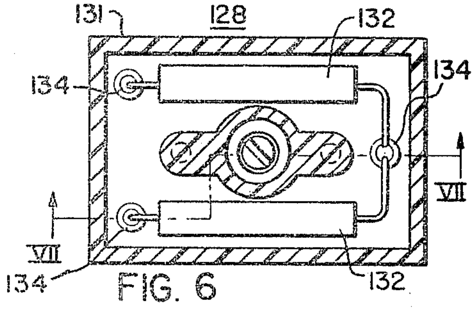
FIG. 6 is a sectional view of the replaceable rating adjuster taken along the line VI—VI of FIG. 3A.
Figure 7:
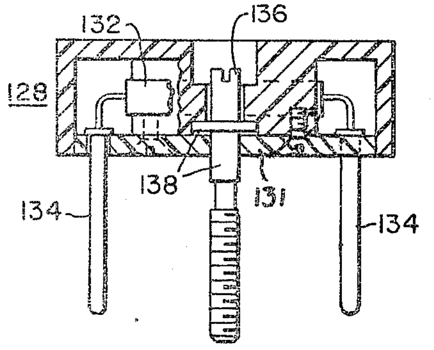
FIG. 7 is a sectional view of the rating adjuster shown in FIG. 6, taken along the line VII—VII.
Figure 4:
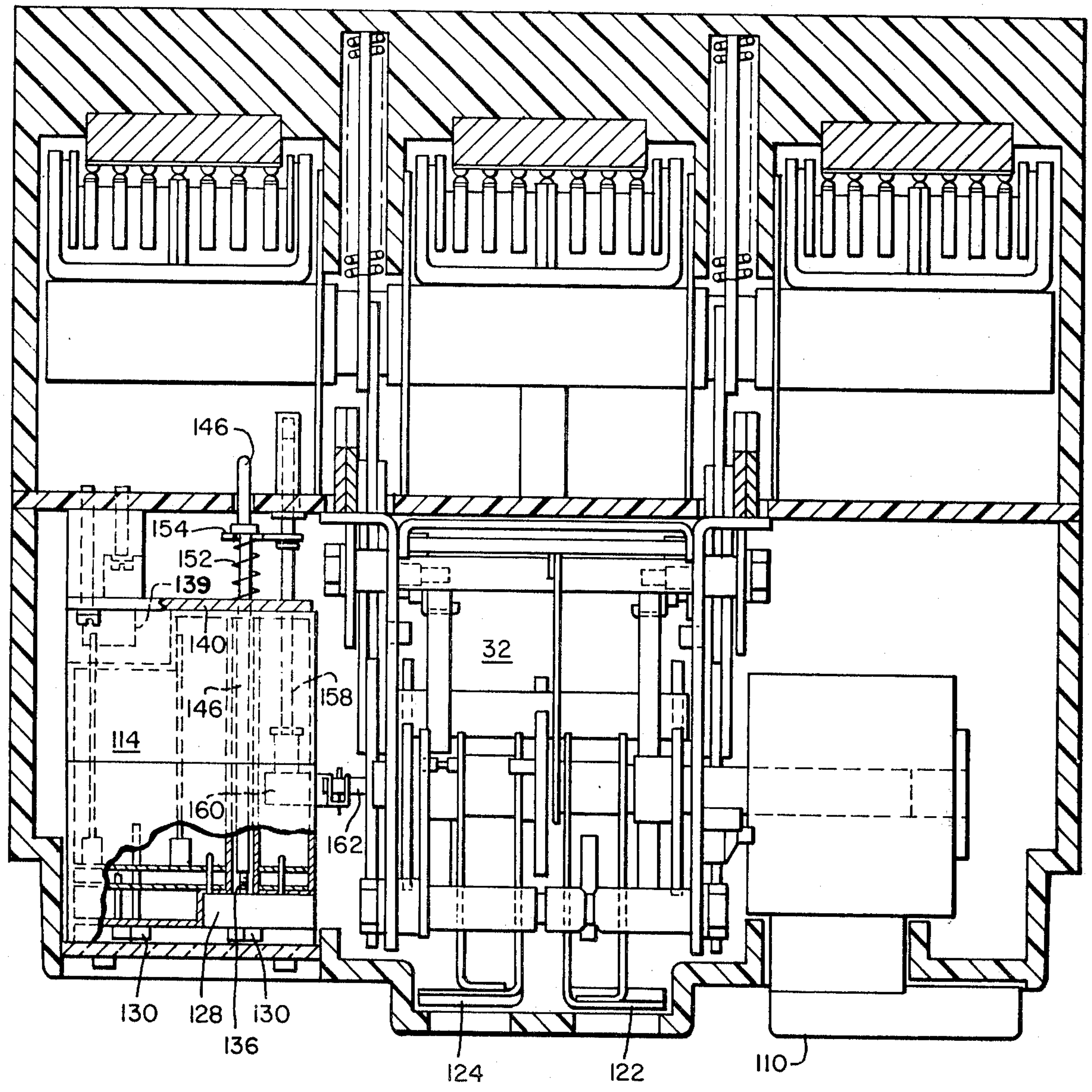
FIG. 4 is a sectional view of the circuit interrupter taken substantially along the line IV—IV of FIG. 1.

The construction of the rating plug 128 is seen most clearly in FIGS. 6 and 7. A housing 131 of molded insulating material contains a pair of resistors 132 supported upon plug-in connecting pins 134. A threaded rod or screw 136 extends through the housing 131 and is movably captured between sections of the housing 131.

Figure 3A:
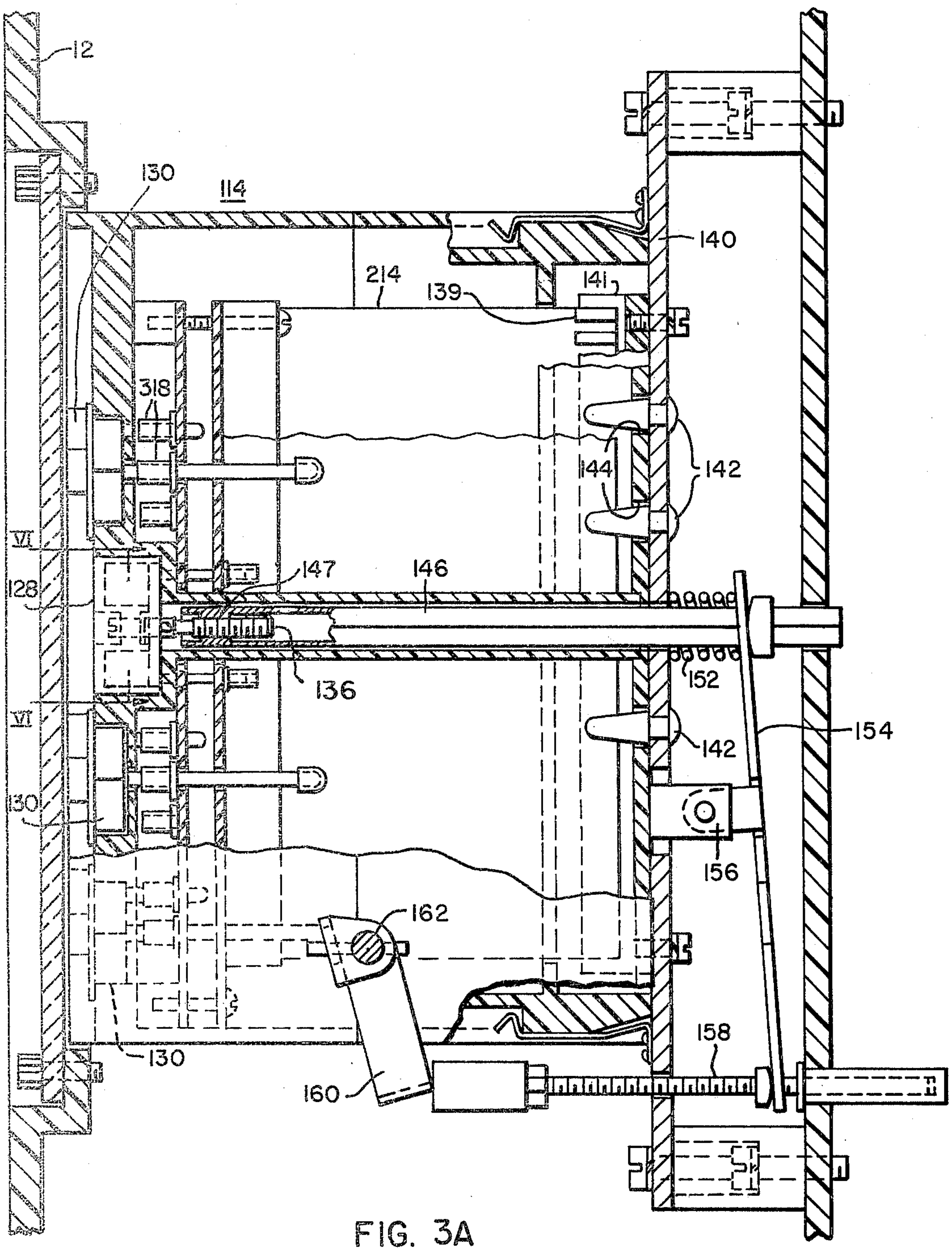
FIG. 3A is a detailed side-sectional view of the trip unit portion of the circuit interrupter shown in FIGS. 1 and 2.
Figure 5:
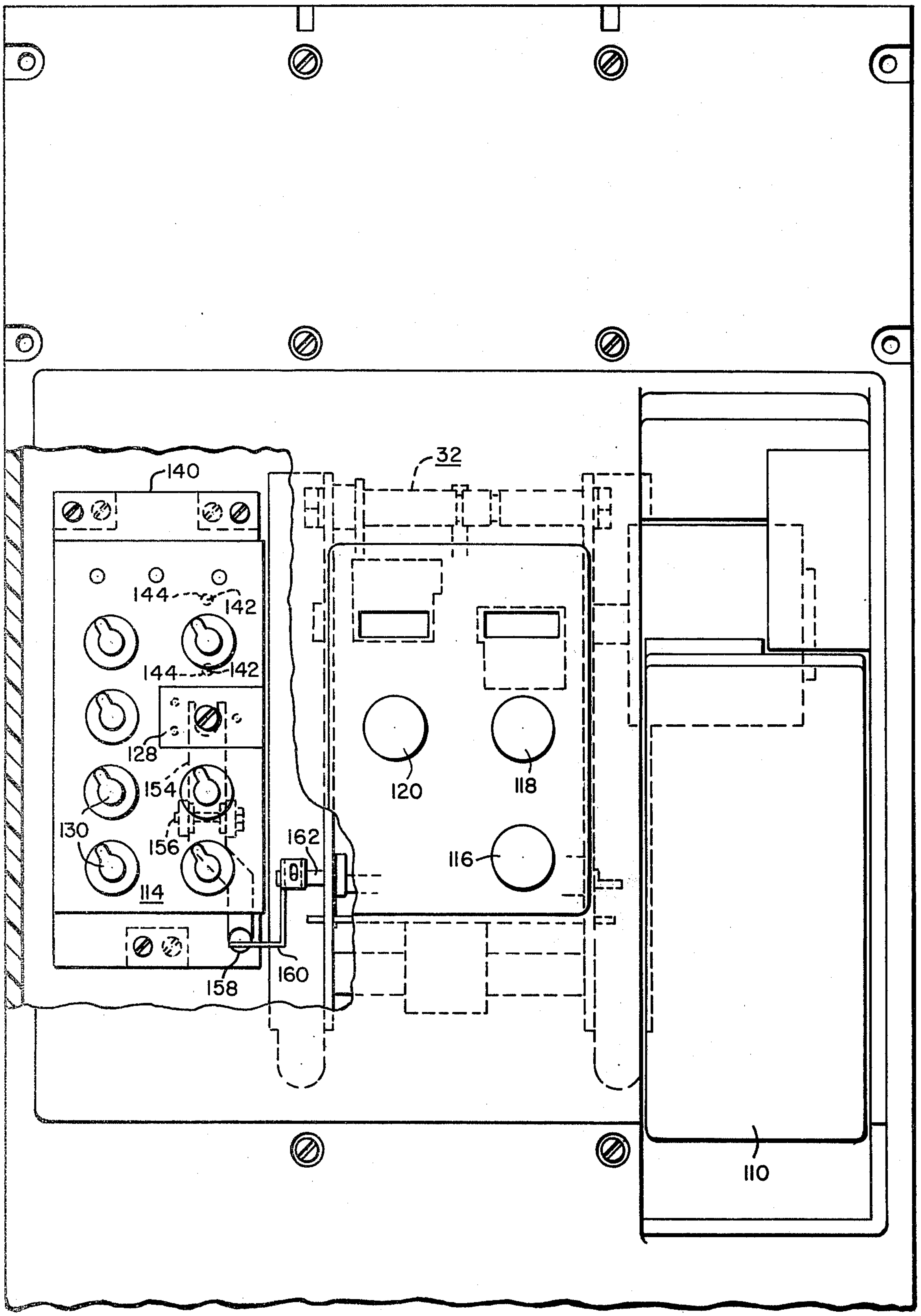
FIG. 5 is a view similar to FIG. 1 with portions cut away to show the lever mechanism of FIGS. 3A–3D.

Referring now to FIG. 3A, it can be seen that the trip unit 114 is seated in a recess of the housing 12 and rests upon a steel mounting plate 140. Electronic circuitry within the trip unit 114 is joined through a plug-in connector 139 to the sensing transformer 38 (FIG. 2) and the contact 22, supplying signal and power to the circuitry. The trip unit 114 is located in the housing recess by rejection pins 142 mounted upon and extending upward from the plate 140. Corresponding holes 144 (FIG. 5) are drilled in the bottom of the trip unit housing. The pins and holes 142 and 144 are arranged in identical patterns such that the pins are received by the holes. Circuit interrupters having different electrical characteristics such as ground fault detection capability, higher interruption rating, etc., have rejection pins 142 arranged in different patterns. Similarly, different trip units 114 having electrical characteristics corresponding to the circuit interrupters have different patterns of holes 144. In each case, the pin pattern and hole pattern for compatible circuit interrupters and trip units is the same, such that only trip units having circuitry compatible with the particular circuit interrupter can be properly inserted in the housing 14. If a noncompatible trip unit is attempted to be inserted, the pins 142 and holes 144 will not line up and the trip unit cannot be seated in the housing. Thus, a common mold can be used for all circuit breaker housing and all trip unit housing while still maintaining a rejection capability to prevent mating of noncompatible trip units and circuit breakers.

As can be seen in FIG. 3A, a hexagonally sectioned tapped tube 146 having an interiorly threaded portion 147 extends through a hexagonally-shaped hole in the mounting plate 140. The tube 146 is free to move back and forth within the bushing 148 but is prevented from rotating in the hex hole. A compression spring 152 is mounted around the bushing 148. The tube 146 rides upon a lever 154 pivotally mounted at 156 to the mounting plate 140. The other end of the lever 154 is connected to a push rod 158 which is in turn connected to a lever 160 attached to the trip arm 162 of the circuit breaker mechanism 32. As is described in the aforementioned copending U.S. patent application Ser. No. 811,227, clockwise rotation of the trip arm 162 is operable to release the toggle mechanism 34 causing the contacts 126, 128 to move to the open position.

Figure 3B:
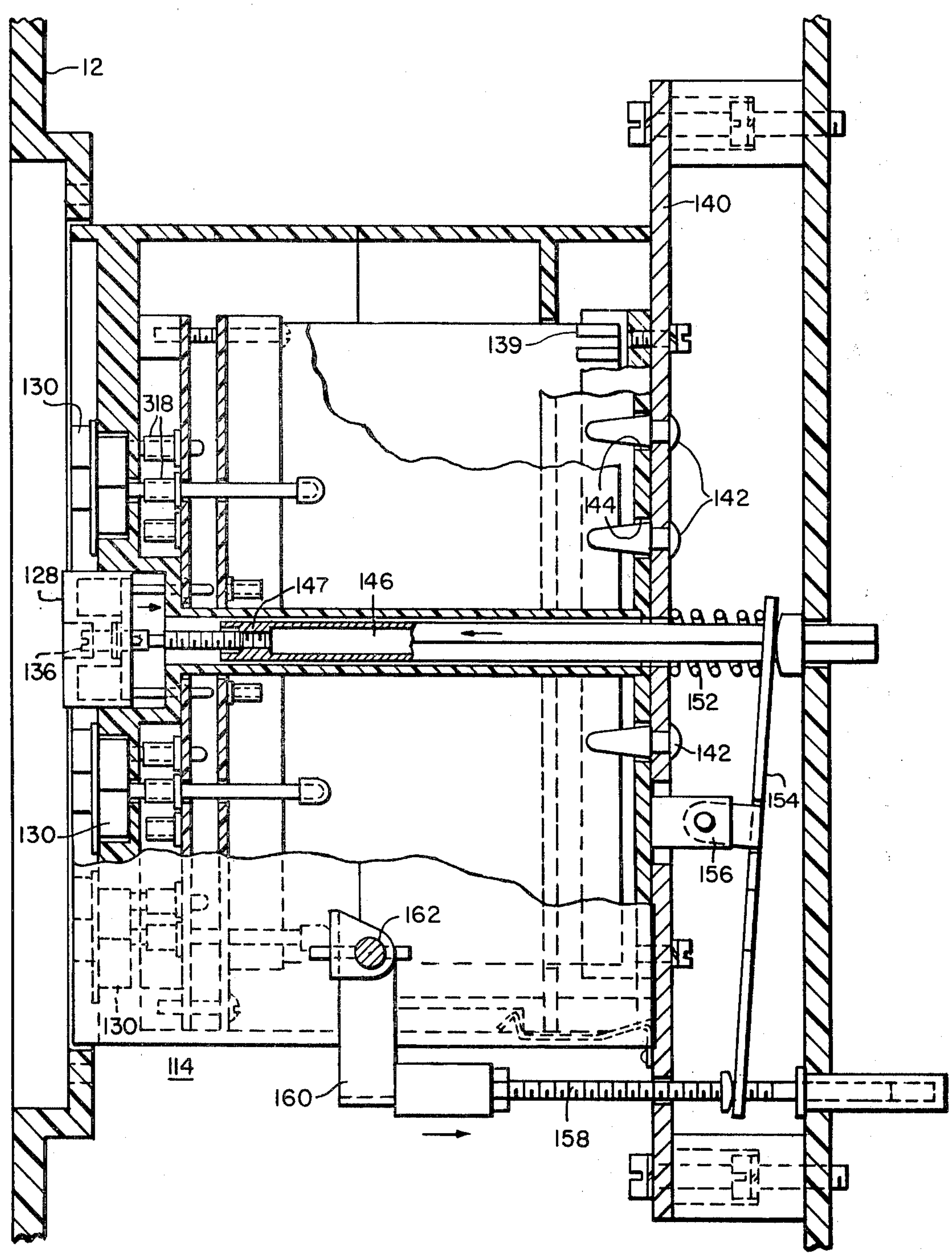
FIG. 3B is a view similar to FIG. 3A, with the rating adjuster only partially inserted.
Figure 3C:
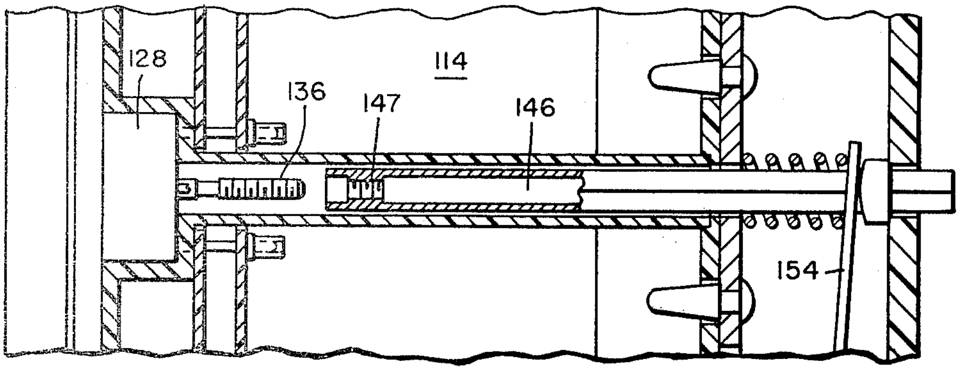
FIG. 3C is a view similar to FIGS. 3A and 3B, with an improper rating adjuster inserted.
Figure 3D:
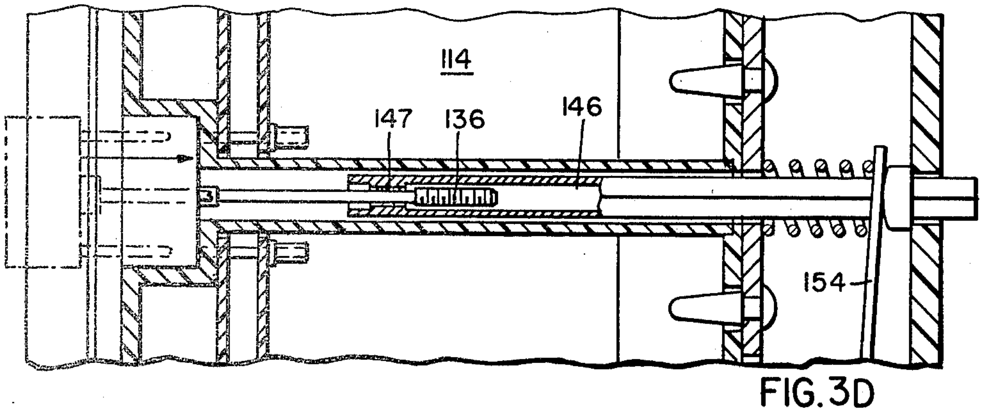
FIG. 3D is a view similar to FIG. 3C with a different type of improper rating adjuster inserted.

With the rating adjuster 128 fully inserted into the recess into the housing of the trip unit 114, it can be seen that the screw 136 can be rotated to engage the threaded portion 147 of the tube 146, thereby drawing the tube 146 to the left against the biasing action of the spring 152. The lever 154 is then pivoted, causing through the action of the push rod 158 a counterclockwise rotation of the trip arm 162, allowing the circuit breaker to be normally operated to any desired open or closed position. If the rating plug 128 is not fully inserted into the housing of the trip unit 114 (as in FIG. 3B), the compression spring 152 will bias the lever 154 clockwise, causing the push rod 158 to be moved to the left, thereby maintaining the trip arm 162 in a position of clockwise rotation. This position, as is described in the aforementioned U.S. patent application Ser. No. 811,227, maintains the circuit breaker in the trip-free condition, whereby it is not possible to cause the contacts 126, 128 to close. The position of the threaded portion 147 within the tapped tube 146 and the length of the screw 136 are coordinated such that only compatible rating plugs, trip units, and circuit breakers will allow the screw 136 to engage the tube 146 in such a manner as to remove the breaker from the trip-free condition. This can be seen most clearly in FIG. 3C wherein an improper rating plug has been inserted into the trip unit 114. The length of the screw 136 is not sufficient to extend into that portion of the tube 146 wherein the threads are formed. Thus, even though the rating plug 128 is fully inserted into the trip unit housing, the tube 146 is not drawn in, allowing the spring 152 to bias the linkage 154, 158, 160, 162 so as to maintain the circuit breaker in the trip-free condition. Similarly in FIG. 3D, the screw 136 is too long, and extends through the threaded portion 147 and is unable to engage and draw in the tube 146.

By providing the proper coordination between trip units and circuit breakers, the present invention allows the same mold to be used for all trip units, and another common mold to be used for all circuit breaker housings within a given circuit breaker family. It can be seen therefore that the present invention provides a coordinated system of removable trip and circuit breakers providing a significant advantage over the prior art at a lower cost.

What is claimed is:

1. A circuit interrupter, comprising:

a housing;

a circuit breaker mechanism disposed in said housing and comprising separable contacts, an operating mechanism responsive to manual operation to open and close said contacts, and trip means responsive to electrical operation to open said contacts;

sensing means responsive to current flow through said contacts;

an interchangeable trip unit removably disposed in said housing and electrically connected between said sensing means and said trip means, said trip unit activating said trip means to open said contacts upon detection of overload current by said sensing means; and rejection means comprising a first mechanical mating member disposed in said housing and having a mechanical structure coordinated with electrical parameters of said circuit breaker mechanism and said sensing means, and a second mechanical mating member having a mechanical structure coordinated with electrical parameters of said trip unit and positioned upon said trip unit to cooperate with said first mechanical mating member to permit a trip unit having electrical parameters compatible with electrical parameters of said operating mechanism and said sensing means to be completely inserted in said housing to effect electrical connection to said sensing means and trip means, said first and second mechanical mating members cooperating to prevent a trip unit having electrical parameters not compatible with the electrical parameters of said operating mechanism and sensing means from being completely inserted in said housing.

2. A circuit interrupter as recited in claim 1 comprising interlock means disposed in said housing and operating said circuit breaker mechanism to a trip-free condition except when said trip unit is completely inserted in said housing.

3. A circuit interrupter as recited in claim 2 wherein said trip unit comprises an interchangeable plug-in rating adjuster and said interlock means comprises a tapped tube attached to said housing and a threaded mounting screw attached to said rating adjuster.

4. A circuit interrupter as recited in claim 1 wherein said first mechanical mating member comprises an extending pin and said second mating member comprises an aperture formed in said trip unit having a diameter greater than the diameter of said pin.

5. A circuit interrupter as recited in claim 4 comprising a plurality of said pins arranged in a pattern and a like number of said apertures arranged in a corresponding pattern whereby each of said pins extends through a corresponding aperture to allow said trip unit to be completely inserted in said housing.

6. A circuit interrupter as recited in claim 2 wherein said trip unit comprises an interchangeable plug-in rating adjuster and said interlock means comprises a tapped tube attached to said housing and a threaded mounting screw attached to said rating adjuster.

7. A circuit interrupter as recited in claim 6 wherein said first mechanical mating member comprises an extending pin and said second mating means comprises an aperture formed in said trip unit having a diameter greater than the diameter of said pin.

* * * * *